(12) United States Patent
Boiman et al.

(10) Patent No.: US 9,976,837 B2
(45) Date of Patent: May 22, 2018

(54) SEEKER HEAD AND AIR VEHICLE INCLUDING SAME

(71) Applicant: ISRAEL AEROSPACE INDUSTRIES LTD., Lod (IL)

(72) Inventors: Keren Boiman, Givat Brenner (IL); Liran Wiener, Hod Hasharon (IL)

(73) Assignee: ISRAEL AEROSPACE INDUSTRIES LTD., Lod (IL)

( * ) Notice: Subject to any disclaimer, the term of this patent is extended or adjusted under 35 U.S.C. 154(b) by 0 days. days.

(21) Appl. No.: 15/129,394

(22) PCT Filed: Apr. 28, 2015

(86) PCT No.: PCT/IL2015/050440
§ 371 (c)(1),
(2) Date: Sep. 26, 2016

(87) PCT Pub. No.: WO2015/166490
PCT Pub. Date: Nov. 5, 2015

(65) Prior Publication Data
US 2017/0108319 A1 Apr. 20, 2017

(30) Foreign Application Priority Data
Apr. 30, 2014 (IL) .......................... 232381

(51) Int. Cl.
*F42B 15/36* (2006.01)
*F42B 10/46* (2006.01)
(Continued)

(52) U.S. Cl.
CPC ............... *F42B 10/46* (2013.01); *B64G 1/64* (2013.01); *F41G 7/008* (2013.01); *F41G 7/2286* (2013.01);
(Continued)

(58) Field of Classification Search
CPC .......... F42B 10/46; F42B 12/44; F42B 15/36; F41G 7/2293; F41F 7/00
(Continued)

(56) References Cited

U.S. PATENT DOCUMENTS 3,637,166 A 1/1972 Nicholson et al.
3,898,668 A * 8/1975 Evans ................... F41G 7/2213
342/424

(Continued)

FOREIGN PATENT DOCUMENTS

| GB | 1605389 | 4/1995 |
| JP | 06082200 | 3/1994 |
| WO | WO2010001402 A1 | 1/2010 |

OTHER PUBLICATIONS

International Search Report and Written Opinion from International Application No. PCT/IL2015/050440 mailed Aug. 27, 2015.
(Continued)

Primary Examiner — Michael David
(74) Attorney, Agent, or Firm — Dorsey & Whitney LLP (57) ABSTRACT

A cover assembly is provided, for use with an instrument package having a common aperture. The cover assembly includes an inner cover member and an outer radome member. The inner cover member is substantially transparent to electromagnetic (EM) radiation of at least a first wavelength range. The radome member is configured for selectively and reversibly covering the inner cover member and transparent to EM radiation of at least a second wavelength range different from the first wavelength range. The second wavelength range includes a radio frequency wavelength range. The outer radome member is configured for being mounted in overlying relationship with respect to the common aperture of the instrument package. The radome member is configured for being initially in overlying relationship with respect to the inner cover member and for
(Continued)

being selectively removed from the overlying relationship with respect to the inner cover member at least during flight conditions.

27 Claims, 5 Drawing Sheets

(51) Int. Cl.
    *H01Q 1/42* (2006.01)
    *H01Q 1/28* (2006.01)
    *G01S 7/481* (2006.01)
    *G01S 13/86* (2006.01)
    *B64G 1/64* (2006.01)
    *F41G 7/00* (2006.01)
    *F41G 7/22* (2006.01)
    *G01S 7/02* (2006.01)

(52) U.S. Cl.
    CPC ............ *F41G 7/2293* (2013.01); *F42B 15/36* (2013.01); *G01S 7/4813* (2013.01); *G01S 13/865* (2013.01); *H01Q 1/281* (2013.01); *H01Q 1/42* (2013.01); *G01S 2007/027* (2013.01)

(58) Field of Classification Search
    USPC ......... 244/121, 3.16; 89/1.51; 102/378, 473; 124/71
    See application file for complete search history.

(56) References Cited

U.S. PATENT DOCUMENTS

| | | | |
|---|---|---|---|
| 4,085,910 A | | 4/1978 | Baker et al. |
| 4,348,677 A | | 9/1982 | Salmond |
| 4,600,166 A | * | 7/1986 | Califano ................ G01C 19/20 102/476 |
| 4,797,683 A | * | 1/1989 | Kosowsky ............... H01Q 1/42 343/705 |
| 4,867,357 A | | 9/1989 | Inglis et al. |
| 5,125,600 A | | 6/1992 | Brumbaugh |
| 5,134,409 A | | 7/1992 | De Groot |
| 5,167,386 A | | 12/1992 | Laquer et al. |
| 5,175,559 A | * | 12/1992 | Schrank ................ H01Q 1/281 343/708 |
| 5,662,293 A | * | 9/1997 | Hower .................. B29C 70/086 244/121 |
| 5,686,929 A | * | 11/1997 | Thiere .................... H01Q 1/281 343/792.5 |
| 5,796,474 A | | 8/1998 | Squire et al. |
| 5,973,649 A | | 10/1999 | Andressen |
| 6,057,915 A | | 5/2000 | Squire et al. |
| 6,060,703 A | * | 5/2000 | Andressen .............. F41G 7/008 250/203.6 |
| 6,198,457 B1 | * | 3/2001 | Walker ................... H01Q 1/005 343/840 |
| 6,219,005 B1 | * | 4/2001 | Szafranek ................ H01Q 1/42 343/705 |
| 6,262,800 B1 | | 7/2001 | Minor |
| 6,268,822 B1 | * | 7/2001 | Sanders .................. F41G 7/008 342/175 |
| 6,484,619 B1 | | 11/2002 | Thomas et al. |
| 6,606,066 B1 | * | 8/2003 | Fawcett .................. F41G 7/008 343/725 |
| 6,788,273 B1 | * | 9/2004 | Schultz .................. B82Y 20/00 343/872 |
| 6,851,645 B1 | * | 2/2005 | Williams ............... F41G 7/2293 244/3.15 |
| 6,919,840 B2 | * | 7/2005 | Friedrich ................ F41G 7/226 102/211 |
| 7,557,769 B2 | * | 7/2009 | Picard .................. H01Q 15/006 343/872 |
| 7,661,625 B2 | | 2/2010 | Rieger et al. |
| 8,330,646 B2 | * | 12/2012 | Baumatz ................... G01S 7/48 342/52 |
| 8,416,127 B2 | * | 4/2013 | Stratis ..................... G01S 7/024 342/174 |
| 8,810,468 B2 | * | 8/2014 | Cannon ................ H01Q 19/027 343/755 |
| 2002/0059881 A1 | | 5/2002 | Steiner |
| 2005/0000383 A1 | | 1/2005 | Facciano et al. |
| 2009/0314890 A1 | * | 12/2009 | Koehler .................... B64C 1/36 244/119 |
| 2011/0036261 A1 | | 2/2011 | Krisher |
| 2013/0199618 A1 | | 8/2013 | Chirivella et al. |
| 2013/0214093 A1 | | 8/2013 | White et al. |
| 2014/0014765 A1 | * | 1/2014 | Sancho Ponce ...... F41G 7/2253 244/3.16 |

OTHER PUBLICATIONS

International Preliminary Report on Patentability from International Application No. PCT/IL2015/050440 mailed Sep. 11, 2016.

\* cited by examiner

SEEKER HEAD AND AIR VEHICLE INCLUDING SAME

TECHNOLOGICAL FIELD

The presently disclosed subject matter relates to seeker heads in general.

PRIOR ART

References considered to be relevant as background to the presently disclosed subject matter are listed below:
U.S. Pat. No. 5,973,649
U.S. Pat. No. 5,167,386
U.S. Pat. No. 4,348,677
U.S. Pat. No. 4,085,910
US 2013/0214093
U.S. Pat. No. 6,057,915
U.S. Pat. No. 5,796,474
U.S. Pat. No. 5,134,409
U.S. Pat. No. 6,484,619
U.S. Pat. No. 6,262,800
WO 2010/001402

Acknowledgement of the above references herein is not to be inferred as meaning that these are in any way relevant to the patentability of the presently disclosed subject matter.

BACKGROUND

Instrument packages having a number of sensor devices and energy emitting devices are well known tools, used for example in aircraft or missiles for detecting, tracking and/or homing onto a target. Such devices often include electro-optical sensors, radar and the like, accommodated in a seeker head, for example.

There are many known applications where different types of sensors are used with airborne platforms, and the sensors are commonly configured for simultaneous operation through a common aperture. In some such systems having a plurality of electro-optical sensors, some including laser radar or other optical elements, a system of mirrors or other optical components may be used for enabling each of the sensors to look through the common aperture at the same time, or at alternating periods via a movable mirror arrangement, for example. Applications are also known having separate dedicated sensors, including a radar system and an electro-optical sensor for example, in which a different part of the available aperture is assigned to each of the sensors. In yet other applications, each sensor may be configured and mounted to an aircraft, for example, as a separate and independent sensor system.

Such electro-optical sensors are often fitted with a transparent cover.

GENERAL DESCRIPTION

According to an aspect of the presently disclosed subject matter there is provided a cover assembly (also interchangeably referred to herein as a cover or as a cover system) for use with an instrument package having a common aperture, comprising:
an inner cover member, substantially transparent to electromagnetic (EM) radiation of at least a first wavelength range;
an outer radome member configured for selectively and reversibly covering the inner cover member and transparent to EM radiation of at least a second wavelength range different from said first wavelength range, the second wavelength range including a radio frequency (RF) wavelength range (thus, EM communication in said second wavelength range between the common aperture and an outside of the outer radome member is via at least the outer radome member (and in some examples also via the inner cover member)); the outer radome member being configured for being mounted in overlying relationship with respect to the common aperture of the instrument package;
the outer radome member being configured for being initially in overlying relationship with respect to the inner cover member and for being selectively removed from said overlying relationship with respect to the inner cover member at least during flight conditions.

For example, there is a lack of overlap between said first wavelength range and said second wavelength range.

For example, the inner cover member is also configured for being mounted in overlying relationship with respect to the common aperture of the instrument package (thus, EM communication in said first wavelength range between the common aperture and an outside of the inner cover member is via the inner cover member).

For example, said first wavelength range includes wavelengths corresponding to at least one of: the visible spectrum; infra red (IR) spectrum; ultraviolet (UV) spectrum.

Additionally or alternatively, for example, said second wavelength range includes RF wavelengths corresponding to at least one of: L-band, S-band, C-band, X-band, K-band, V-band, W-band, Multi-band, Y-band.

Additionally or alternatively, for example, said inner cover member is further substantially transparent to EM radiation of said second wavelength range.

Additionally or alternatively, for example, the inner cover member is made from a material transparent to said radiation of at least said first wavelength range.

Additionally or alternatively, for example, the inner cover radome cover is made from any one of: Silicon, Silicon oxide (SiO), or other Silicon-based materials; Copper oxide (CuO); Manganese Oxide (MnO); Germanium; Sapphire; Magnesium aluminate spinel ($MgAl_2O_4$); Yttria; AlON ($Al_{23}O_{27}N_5$); Alumina; YAG, Nd:YAG; plastic; glass; composite materials; transparent spinel.

Additionally or alternatively, for example, the outer radome cover is made from a material transparent to said radiation of said second wavelength range.

Additionally or alternatively, for example, the outer radome cover is made from any one of: Slip Cast Fused Silica; ceramic materials; composite materials such as for example quartz-based composite materials; Teflon; some plastics; Ultem; fiberglass; PTFE-coated fabrics; boron carbide, alumina, glass, silicon carbide.

Additionally or alternatively, for example, the inner member is formed as a transparent dome, or any other suitable aerodynamic shape having a flat or rounded nose section that allows the EM radiation of the first wavelength range to pass through with zero distortion or with a minimum distortion, and that optionally allows the EM radiation of the second wavelength range to pass through with zero distortion or with a minimum distortion.

Additionally or alternatively, for example, the outer member has an ogive form, or any other suitable aerodynamic shape, for example a cone.

Additionally or alternatively, for example, said outer radome member is reversibly engageable with respect to the inner cover member. Thus, for example, when the outer radome member is initially in said overlying relationship with respect to the inner cover member the outer radome member is engaged with respect to the inner cover member; conversely, when the outer radome member is removed from said overlying relationship with respect to the inner cover member, said outer radome member is automatically disengaged with respect to the inner cover member.

Additionally or alternatively, for example, the outer radome member is formed from a plurality of radome segments, wherein in said overlying relationship with respect to the inner cover member said radome segments are mutually engaged together, and wherein said outer radome member is selectively removable from said inner cover member by mutually disengaging said radome segments.

Additionally or alternatively, for example, said radome segments are reversibly connected to one another along longitudinal edges thereof when mutually engaged together.

Additionally or alternatively, for example, said radome segments are held together via explosive bolts, which are configured for being selectively activated to separate the radome segments from one another.

Additionally or alternatively, for example, said radome segments comprise reactive material, wherein upon activation of the reactive material, a mechanical connection between said radome segments is weakened or destroyed, enabling said radome segments to become separated from one another.

Additionally or alternatively, for example, the cover assembly is configured for use with a seeker head accommodating the instrument package, and wherein at least the inner cover member is configured for being affixed to the seeker head.

Additionally or alternatively, for example, the cover assembly is configured for use with a sensor including the instrument package, and wherein at least the inner cover member is configured for being affixed to the sensor.

Additionally or alternatively, for example, the cover assembly further comprises a radome cover for selectively and reversibly covering the outer radome member.

Additionally or alternatively, for example, the outer radome member is configured for being concurrently in overlying relationship with respect to the common aperture when initially in said overlying relationship with respect to the inner cover member.

According to the above aspect of the presently disclosed subject matter there is also provided a seeker head for an air vehicle comprising:
  a cover assembly and instrument package having a common aperture, as defined in the above aspect of the presently disclosed subject matter;
  the instrument package comprising:
  at least one first sensing/emitting unit configured for operating in said first wavelength range via emission/reception of EM radiation in said first wavelength range through at least said inner cover member;
  at least one second sensing/emitting unit configured for operating in said first wavelength range, via emission/reception of EM radiation in said second wavelength range through at least said outer radome
  each said sensing/emitting unit adapted for at least one of sensing and emitting energy along a respective sensing/emitting unit line of sight aligned with respect to the common aperture of said instrumentation package.

For example, said at least one first sensing/emitting unit includes any one of: an imaging camera, CCD, CMOS, configured for video imaging and/or still picture imaging, in any one or more of the visible spectrum, the infra red spectrum (IR), or in the ultraviolet spectrum (UV); a visual unit, an IR sensor, a thermal sensor (e.g. FLIR sensor), a NIR (near infra-red) sensor; laser-based module including for example LADAR or LIDAR; bolometric sensor.

Additionally or alternatively, for example, said at least one first sensing/emitting unit includes any one of: a passive RF seeker; an active or semi active RADAR seeker; an RF range sensor; a Doppler radar; a synthetic aperture radar (SAR); passive phased array/passive electronically scanned array (PESA) seeker; active phased array/active electronically steered array/active electronically scanned array (AESA) seeker/DBF (digital beam forming) seeker/proximity sensor; an anti-radiation RF sensor.

Additionally or alternatively, for example, the seeker head further comprises a controller for selectively causing the outer radome member to be removed from said overlying relationship with the inner cover member according to preset criteria. For example, said controller is further configured for concurrently operating said at least one first sensing/emitting unit and said at least one second sensing/emitting unit for at least a predetermined time interval after said outer radome member is removed to thereby synchronize operation of said at least one first sensing/emitting unit with said at least one second sensing/emitting unit. For example, the instrument package can be further configured for selectively switching operation from the at least one first sensing/emitting unit to the at least one second sensing/emitting unit via a handshake procedure. Such switching can be controlled by said controller, for example an airborne computer. For example, the switching operation can be initiated according to said preset criteria. For example, such criteria can include one or more of the following: after the passage of a certain time period after launch of the vehicle on which the instrument package is mounted; when the vehicle reaches a certain distance from an intended target; when the vehicle reaches a certain geographical location (in which case for example the vehicle can also be configured for determining its geographical location); and so on. The criteria can also include that vehicle on which the instrument package is mounted is in flight or otherwise in a trajectory in the atmosphere.

According to the above aspect of the presently disclosed subject matter there is provided an air vehicle comprising a seeker head as defined according to the above aspect of the presently disclosed subject matter. For example, the air vehicle is any one of an air-to-air missile, an air-to-surface missile, a surface-to-air missile, a surface-to-surface missile, a cruise missile, an anti-missile interceptor, munitions, a gliding bomb, a guided bomb, a rocket, a MK bomb including a homing kit, a UAV.

According to the above aspect of the presently disclosed subject matter there is provided a method for operating a seeker head, comprising
  providing a seeker head as defined according to the above aspect of the presently disclosed subject matter;
  operating the seeker head to selectively remove the outer radome member from said overlying relationship with the inner cover member according to preset criteria.

For example, such criteria can include one or more of the following: after the passage of a certain time period after launch of the vehicle on which the instrument package is mounted; when the vehicle reaches a certain distance from an intended target; when the vehicle reaches a certain geographical location (in which case for example the vehicle can also be configured for determining its geographical location); and so on. The criteria can also include that vehicle on which the instrument package is mounted is in flight or otherwise in a trajectory in the atmosphere.

BRIEF DESCRIPTION OF THE DRAWINGS

In order to better understand the subject matter that is disclosed herein and to exemplify how it may be carried out in practice, examples will now be described, by way of non-limiting example only, with reference to the accompanying drawings, in which.

DETAILED DESCRIPTION

Referring to FIGS. 1 to 4, a cover assembly (also referred to interchangeably herein as a cover or as a cover system) according to a first example of the presently disclosed subject matter, generally designated 100, comprises an inner cover member 200 and an outer radome member 300.

The cover assembly 100 is configured for being mounted to the forward end 2 of a vehicle 1, in particular an air vehicle. In this example, the air vehicle 1 is a missile, for example any one of: an air-to-air missile, an air-to-surface missile, a surface-to-air missile, a surface-to-surface missile, and cruise missile. In alternative variations of this example, the air vehicle can be any one of: anti-missile interceptor, munitions, gliding bomb, guided bomb, rocket, MK bomb including a homing kit, some types of UAV's.

Figure 3:
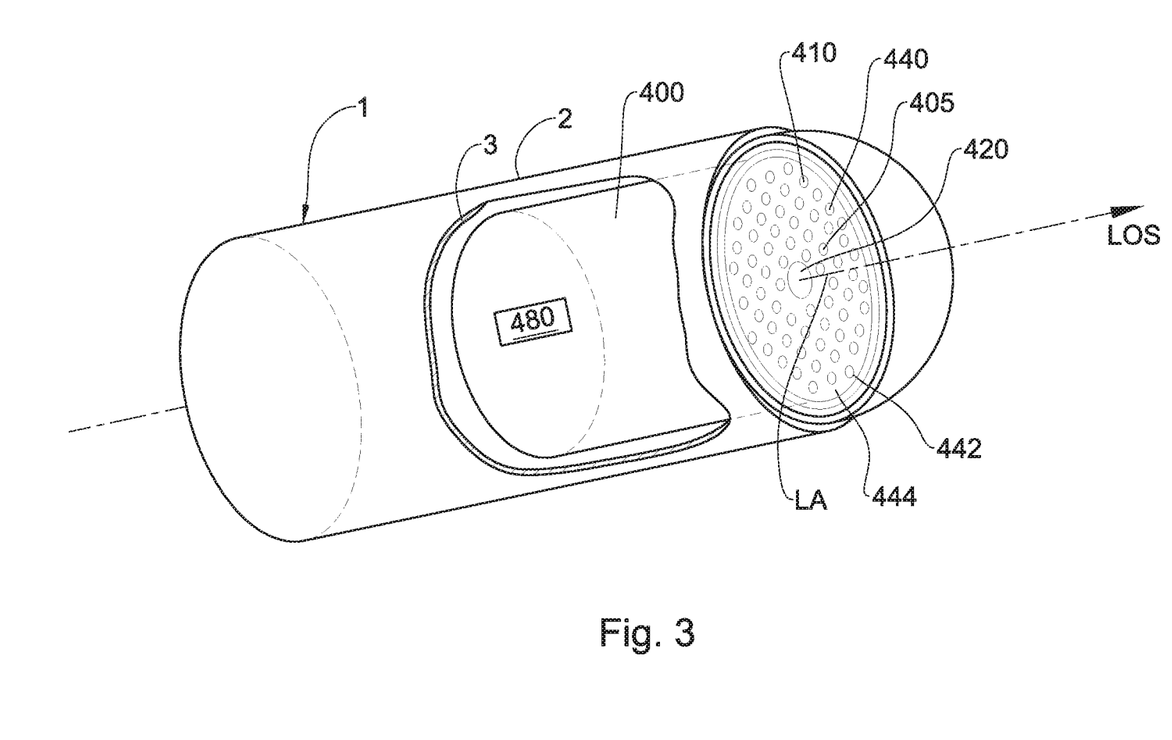
FIG. 3 is a partially fragmented isometric view of the example of FIG. 1, in which the respective outer radome member is fully removed and the cover assembly is in the uncovered configuration.

Referring in particular to FIG. 3, the forward end 2 comprises the seeker head of the air vehicle 1, and comprises an external casing 3, accommodating an on-board instrument package 400 having a sensor/emitting face 410 and defining a common instrument aperture 405 facing in a general forward direction along the longitudinal axis LA of the air vehicle 1.

Figure 6:
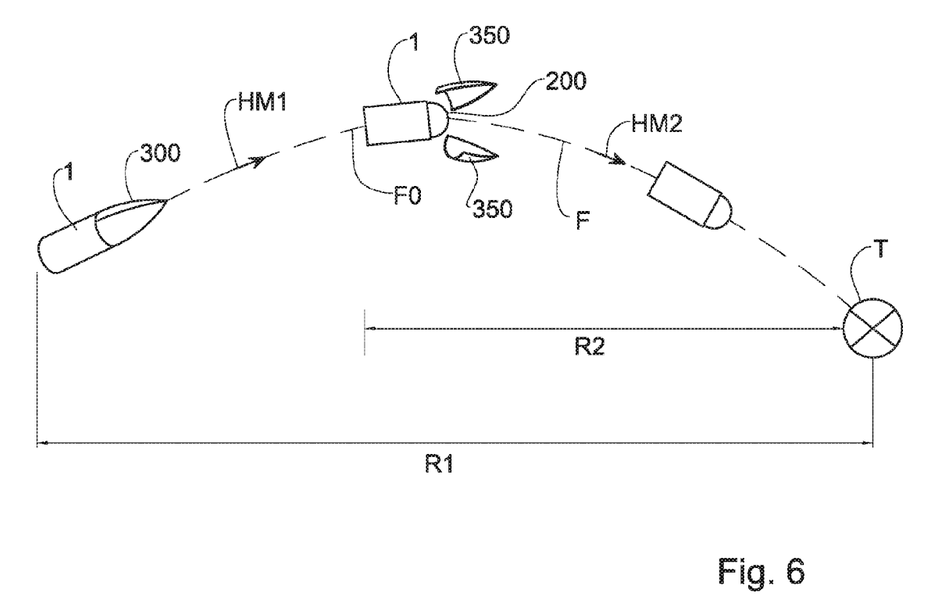
FIG. 6 is a schematic illustration of an example of a trajectory for the example of FIG. 1.

Referring also to FIG. 6, in this example, the air vehicle 1 is configured for homing onto a target T using an on-board instrument package 400 operatively connected to a controller in the form of an airborne computer 480, which is configured for steering the air vehicle 1 in response to homing data and/or homing signals received from the instrument package 400 responsive to EM energy transmitted sand/or received via common aperture 405. The instrument package 400 comprises at least one first sensing/emitting unit in the form of electro-optic (EO) unit 420, and at least one second sensing/emitting unit in the form of radio frequency (RF) unit 440. Furthermore, in at least this example, the respective apertures of each of the EO unit 420 and the RF unit 440 are at common aperture 405, centered on the longitudinal axis LA.

The cover assembly 100 is configured for selectively protecting operation of the instrument package 400 (in particular for selectively protecting proper operation of the units 420, 440) during the various operations phases thereof, particularly during flight of the air vehicle 1, while concurrently allowing operation of the units 420, 440, as will become clearer herein.

The EO unit 420 is configured for operating with respect to a particular range of operating wavelengths $\lambda_{EO}$, i.e., for sensing and/or emitting electromagnetic (EM) energy having wavelengths within this operating range, with respect to a field of view (FOV) and along a line of sight (LOS) generally forward of the sensor/emitting face 410. For example, the EO units 420 can include one or more of: an imaging camera, CCD, CMOS, and so on, for imaging (video and/or still pictures) in the visible spectrum, and/or in the infra red spectrum (IR) and/or in the ultraviolet spectrum (UV), for example including a visual unit, an IR sensor, a thermal sensor (e.g. FLIR sensor), a NIR (near infra-red) sensor; laser-based module including for example LADAR or LIDAR, or other laser sensor; bolometric sensor; other heat seekers.

The RF unit 440 is configured for operating with respect to a particular range of operating wavelengths $\lambda_{RF}$, i.e., for sensing and/or emitting electromagnetic (EM) energy having wavelengths within this operating range, also with respect to the field of view (FOV) generally forward of the sensor/emitting face 410. For example, the RF unit 440 comprises a RADAR sensor/emitter system, capable of operating in one or more of L-band, S-band, C-band, X-band, K-band, V-band, W-band, Multi-band, Y-band. For example, the RF units 420 can include one or more of: a passive RF seeker; an active or semi active RADAR seeker; an RF range sensor; a Doppler radar; a synthetic aperture radar (SAR); passive phased array/passive electronically scanned array (PESA) seeker; active phased array/active electronically steered array/active electronically scanned array (AESA) seeker/DBF (digital beam forming) seeker/proximity sensor; an anti-radiation RF sensor.

In the illustrated example of FIGS. 1 to 4, the range of operating wavelengths $\lambda_{EO}$ for the EO unit 420 is totally different from the range of operating wavelengths $\lambda_{RF}$ of the RF unit 440, i.e., there is no overlap between the range of operating wavelengths $\lambda_{EO}$ and the range of operating wavelengths $\lambda_{RF}$. In alternative variations of this example, there can be some overlap between the range of operating wavelengths $\lambda_{EO}$ and the range of operating wavelengths $\lambda_{RF}$, while the range of operating wavelengths $\lambda_{EO}$ and the range of operating wavelengths $\lambda_{RF}$ are not identical and thus different from one another.

In this example, the RF unit 440 is fixedly located with respect to the EO unit 420 and with respect to the longitudinal axis LA. The EO unit 420 has its aperture, and optical axis at the aperture, aligned with the longitudinal axis LA. Alternatively, EO unit 420 has its aperture, and optical axis at the aperture, aligned with an axis parallel to or at an angle with the longitudinal axis LA. Optionally, the EO unit 420 has an element, for example a field lens or window, on the sensor/emitting face 410. In alternative variations of this example, a plurality of EO units 420 are provided, each having its aperture, and its respective optical axis at the aperture, aligned with or offset from the longitudinal axis LA or at angle thereto. In these cases, the apertures of each of the EO units 420 are included within the system's common aperture 405.

The RF unit 440 is concurrently concentric with respect to the EO unit 420, and also has its aperture aligned with the longitudinal axis LA. Alternatively, RF unit 440 has its aperture, and optical axis at the aperture, aligned with an axis parallel to or at an angle with the longitudinal axis LA.

The RF unit 440 in this example is configured as an SAR array, and comprises a plurality of radiating elements 442, for example radiating tiles, radially and circumferentially distributed over an annular ring 444 over the sensor/emitting face 410. For example, each radiating element 442 comprises a plurality of RF down-conversion units, a plurality of digital beam forming units and a plurality of Gigabits X-links, mounted on a mechanical frame. For example, the SAR array can be configured for operating in any suitable band, for example from the X-Band to the L-Band.

In this example, the sensor/emitting face 410 is fixed in orientation with respect to longitudinal axis LA. However, in alternative variations of this example, the sensor/emitting face 410, or alternatively the sensing package 400, can be mounted to the air vehicle 1, in particular to the forward end 2, via a suitable tilt and pan mechanism, for example via gimbals, to allow the azimuth and/or elevation of the field of view (FOV) of one or both of the unit 420, 440 to be pivoted in pitch and/or way with respect to the longitudinal axis LA of the vehicle 1.

In this example, the instrument package 400 is further configured for selectively switching operation from the RF unit 440 to the EO unit 420 via a handshake procedure (also interchangeably referred to herein as a handover procedure). For example, the EO unit 420 begins to operate as soon as the RF unit 440 ceases its operation. Alternatively, the EO unit 420 begins to operate before the RF unit 440 ceases its operation so that both the EO unit 420 and the RF unit 440 operate concurrently for an overlapping period of time, and thereafter the EO unit 420 operates on its own. During the overlapping period of time in which both EO unit 420 and the RF unit 440 operate concurrently, the operation of the RF unit 440 is phased out while the EO unit 420 is brought into full operation.

Such switching can be controlled by a suitable controller, for example airborne computer 480. For example, the switching operation can be initiated according to preset criteria, such as for example one or more of the following: after the passage of a certain time period after launch of the vehicle 1; when the vehicle 1 reaches a certain distance from an intended target; when the vehicle 1 reaches a certain geographical location (in which case for example the vehicle 1 is configured for determining its geographical location); when the RF unit 440 cannot identify the target or cannot provide target data; when the RF unit 440 becomes inoperative or its operation is faulty; and so on.

Alternatively or additionally, the instrument package 400 is configured for hybrid operation (also referred to herein as data fusion operation) in which the RF unit 440 and the EO unit 420 are concurrently operated, and operation of the two units is not terminated.

The inner cover member 200 is transparent to EM radiation of a first wavelength range $\lambda 1$, corresponding to the range of operating wavelengths $\lambda_{EO}$ of the EO unit 420. Thus, first wavelength range $\lambda 1$ can be identical to the operating wavelengths range $\lambda_{EO}$, or, the first wavelength range $\lambda 1$ can be broader than, and thus include, the range of operating wavelengths range $\lambda_{EO}$. Thus, in the particular example where the EO unit 420 operates in the visible spectrum, the inner cover member 200 is also transparent at least to visible light.

For example, the inner cover member 200 can be made from one or more of the following materials, generally depending on the particular values desired or required for the first wavelength range $\lambda 1$: Silicon, Silicon oxide (SiO) or other Silicon-based materials; Copper oxide (CuO); Manganese Oxide (MnO); Germanium; Sapphire; Magnesium aluminate spinel ($MgAl_2O_4$); Yttria; AlON ($Al_{23}O_{27}N_5$); Alumina; YAG, Nd:YAG; plastic; glass; composite materials; transparent spinel.

In this example, the EO unit 420 has its optical axis in fixed spatial relationship with the longitudinal axis LA, and a particular FOV. Thus, in this example it is only necessary for part of the inner cover member 200 (that is intersected by the FOV) needs to be transparent to the first wavelength range $\lambda 1$, while the remainder of the inner cover member 200 need not be so.

The outer radome member 300 is transparent to EM radiation of a second wavelength range $\lambda 2$ corresponding to the range of operating wavelengths $\lambda_{RF}$ of the RF unit 440. Thus, second wavelength range $\lambda 2$ can be identical to the operating wavelengths range $\lambda_{RF}$, or, the second wavelength range $\lambda 2$ can be broader than, and thus include, the operating wavelengths range $\lambda_{RF}$. Thus, in the particular example where the RF unit 440 is a SAR operating in the X-Band and the K-Band or the X-Band to the L-Band, the outer radome member 300 is also transparent at least to EM energy in the X-Band and the K-Band or the X-Band to the L-Band, respectively.

For example, the outer radome member 300 can be made from one or more of the following materials, depending on the particular values of the second wavelength range $\lambda 2$: Slip Cast Fused Silica; ceramic materials; composite materials such as for example quartz-based composite materials; Teflon; some plastics; Ultem; fiberglass; PTFE-coated fabrics, boron carbide, alumina, glass, silicon carbide.

Thus, in at least some examples, some composite materials can be used only for one or the other but not for both of outer radome member 300 and the inner cover member 200. In at least some other examples, plastic materials can be used for both of outer radome member 300 and the inner cover member 200. In at least some other examples, glass can be used for both of outer radome member 300 and the inner cover member 200. In this example, the inner cover member 200 is also transparent to EM radiation of the second wavelength range $\lambda 2$, or at least to the range of operating wavelengths $\lambda_{RF}$ of the RF unit 440, and thus the RF unit 440 can operate via the inner cover member 420 and the outer cover member 440.

In this example, the EO unit 420 has its optical axis (at or within the common aperture 405) in fixed spatial relationship with the longitudinal axis LA, and the EO unit 420 also has a particular FOV. Thus, in this example it is only necessary for part of the inner cover member 200 (that is intersected by the FOV) to be transparent to the first wavelength range $\lambda 1$, while the remainder of the inner cover member 200 need not be so.

In this example, the first wavelength range $\lambda 1$ is totally different from the second wavelength range $\lambda 2$, i.e., there is no overlap between the wavelength range $\lambda 1$ and the second wavelength range $\lambda 2$. In alternative variations of this example, there can be some overlap between the wavelength range $\lambda 1$ and the second wavelength range $\lambda 2$, while the first wavelength range $\lambda 1$ and the second wavelength range $\lambda 2$ are not identical and thus different from one another.

Figure 1:
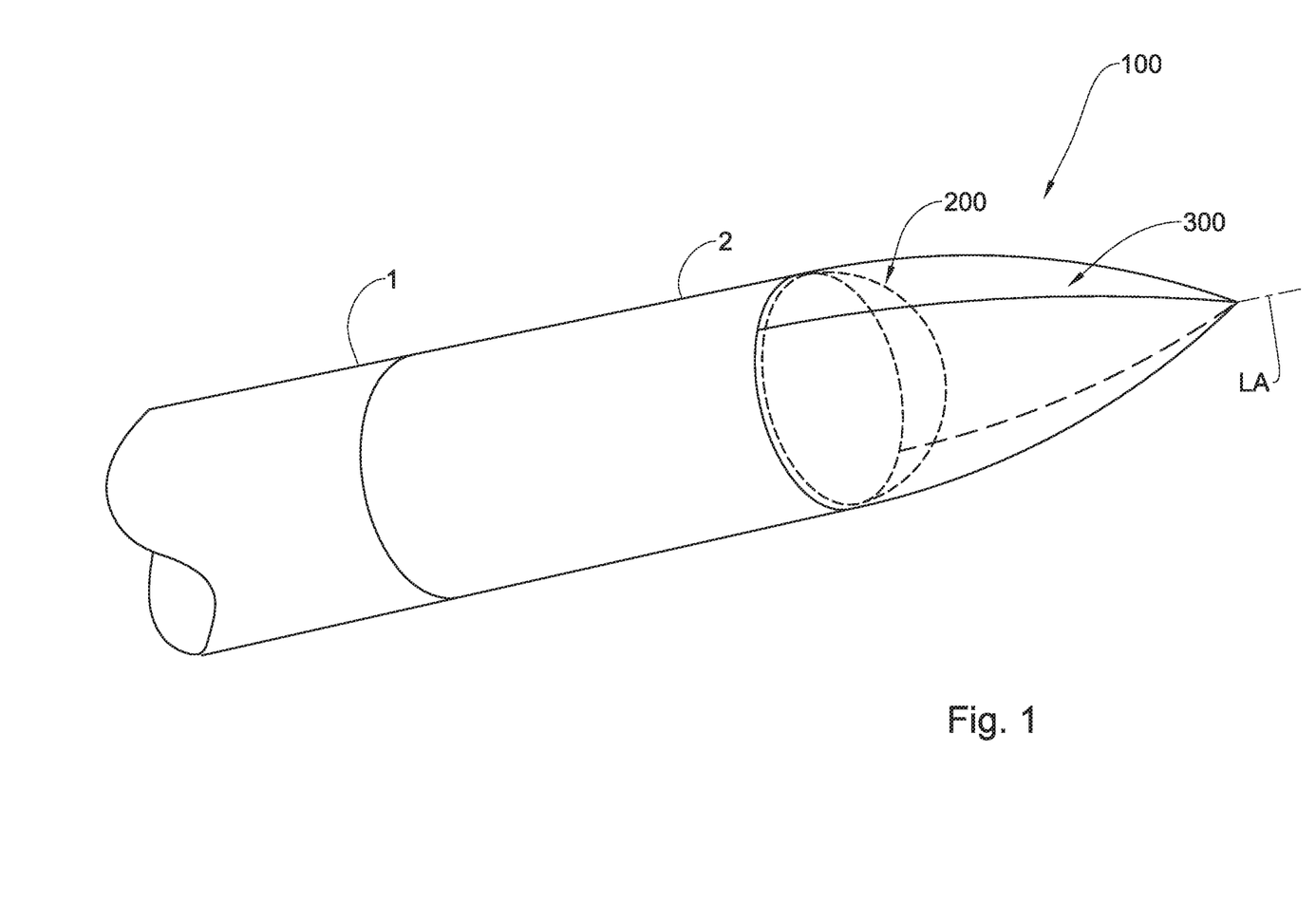
FIG. 1 is an isometric view of a cover assembly according to a first example of the presently disclosed subject matter installed on a forward end of an air vehicle, in which the cover assembly is in the covered configuration.
Figure 2:
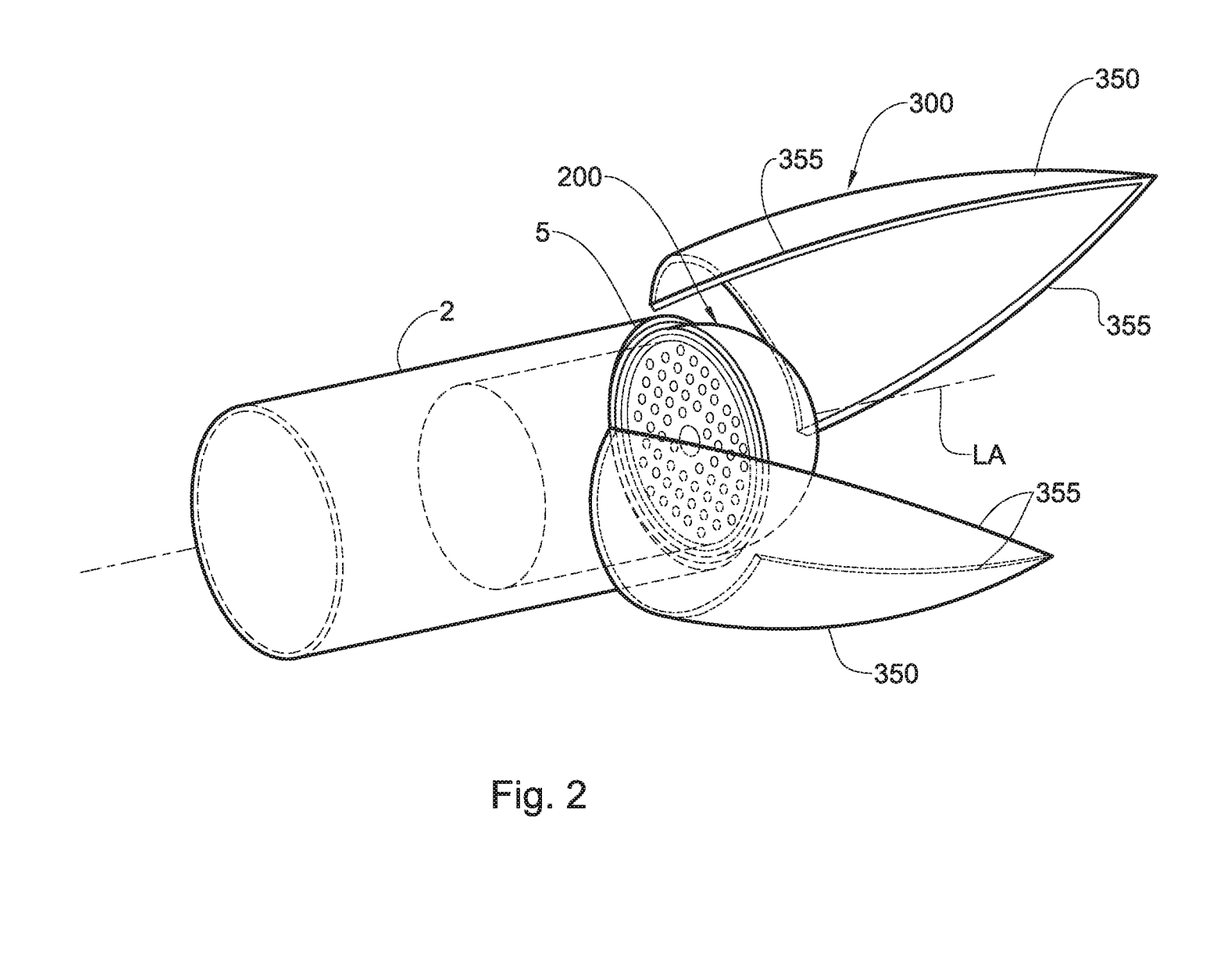
FIG. 2 is an isometric view of the example of FIG. 1, in which the respective outer radome member is in the process of being removed.

In the covered configuration illustrated in FIG. 1, the outer radome member 300 covers the inner cover member 200 (both radially and axially with respect to the longitudinal axis LA), and both are in overlying relationship with respect to the common aperture 405 of the instrument package 400. Thus, the outer radome member 300 is configured for being initially in overlying relationship with respect to the inner cover member 200; the outer radome member is further configured for being concurrently in overlying relationship with respect to the common aperture 405 when initially in the aforesaid overlying relationship with respect to the inner cover member 200. Furthermore, and as will become clearer herein, the outer radome member 300 is also configured for being selectively removed from the inner cover member 200 at least during flight conditions, to thereby expose the inner cover member 200 to the airflow—referred to herein as the uncovered configuration.

In this example, and in other examples, the inner cover member 200 has a geometrical form that is at least partially aerodynamic, for example generally rounded, such that when the inner cover member 200 is exposed to an external airflow, such as in the uncovered configuration of FIG. 3 for example, it minimizes drag or at least provides low drag to the vehicle 1.

Figure 4:
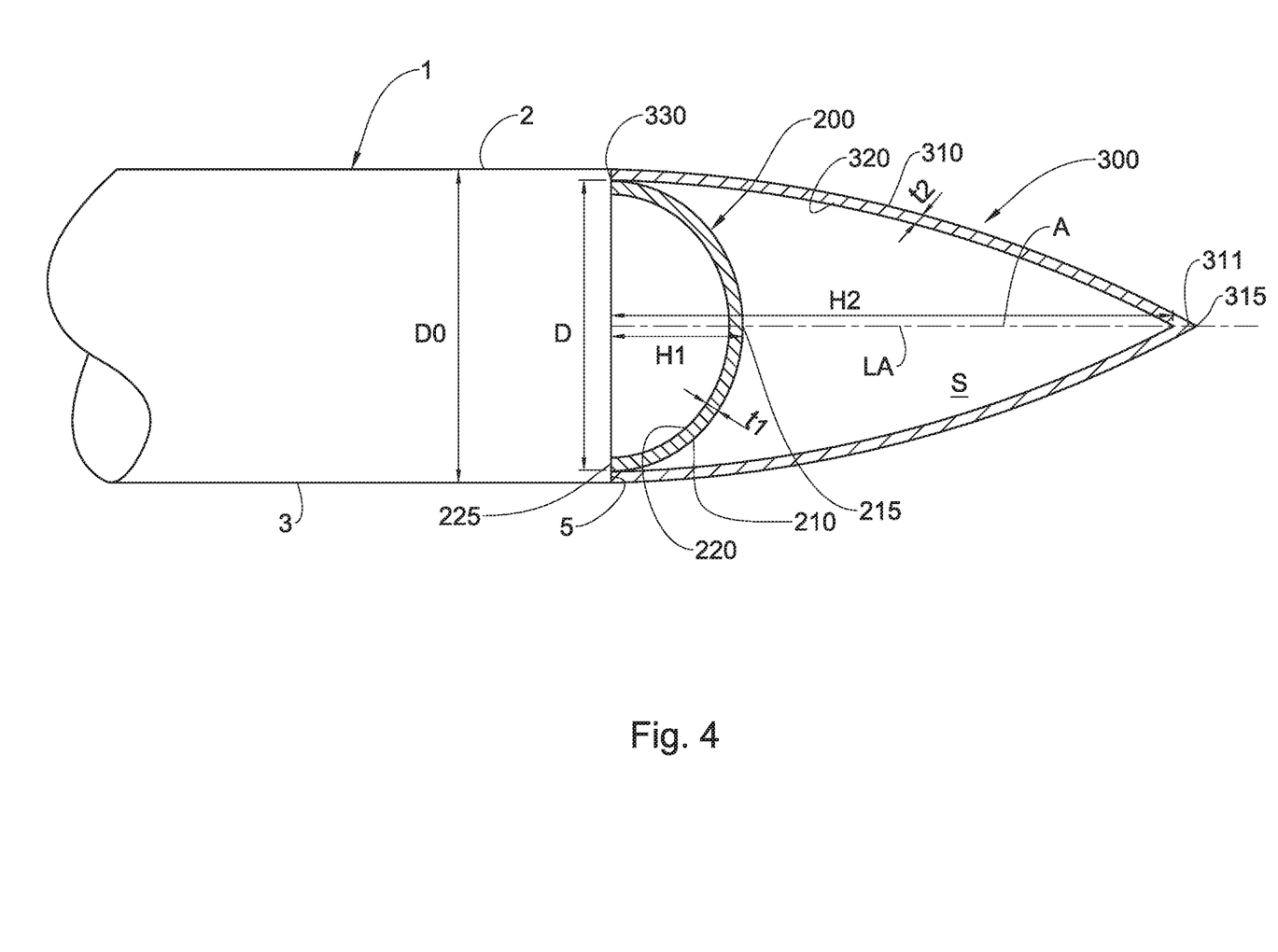
FIG. 4 is a side cross-sectional view of the example of FIG. 1.

In this example, and referring in particular to FIG. 4, the inner cover member 200 is in the form of a dome, comprising a convex dome outer surface 210 separated from a concave dome inner surface 220 via the dome thickness t1. In this example the longitudinal axis LA intersects the dome at its apex 215, and the dome is axisymmetric about longitudinal axis LA. In this example the dome is hemispherical, having uniform curvature throughout, and the dome outer surface 210 having a height H1 along the longitudinal axis LA about half the base diameter D of the dome outer surface 210. However, in alternative variations of this example, the dome can be non-axisymmetric, and/or can have variable curvature and/or can have a height H1 that is greater than or that is less than the half the base diameter D, for example.

In this example, the outer surface base diameter D is less than the outer diameter DO of the forward end 2, providing an annular shoulder 5 between the base 225 of the dome and the outer skin of external casing 3.

In at least this example, the inner cover member 200 is configured for remaining fixed in position on the forward end, throughout most or all of the flight or trajectory of the air vehicle 1.

In this example the inner cover member 200 has rounded cross-sections in planes transverse to the longitudinal axis LA—for example circular cross-sections, or elliptical cross-sections, or super elliptical cross-sections. However, in alternative variations of this example and in other examples, the inner cover member 200 has non-rounded cross-sections in planes transverse to the longitudinal axis LA—for example polygonal, providing a faceted configuration for the inner cover member 200.

In this example, and in other examples, the outer radome member 300 has a geometrical form that is at least partially aerodynamic, for example at least partially rounded or pointed, such that when the outer radome member 300 is mounted on the vehicle 1 and covering the inner member 200 (and thus the outer radome member 300 is exposed to an external airflow when the air vehicle is in flight in the atmosphere), such as in the covered configuration of FIG. 1 for example, it minimizes drag or at least provides low drag to the vehicle 1.

In this example, the outer radome member 300 is axisymmetric about an axis A, which is parallel and co-axial with longitudinal axis LA when in the covered configuration.

In this example, the outer radome member 300 is in the form of an ogive, comprising a pointed nose 311, and an ogive outer surface 310 separated from an ogive inner surface 320 via the thickness t2 of the outer radome member 300, and annular base edge 330. In this example the longitudinal axis LA intersects the ogive via the nose 311, i.e., at its apex 315, and the ogive is axisymmetric about axis A. In this example the inner surface 320 has a height H2 along the longitudinal axis LA greater than the height H1 of the dome outer surface 210, providing a spacing S between the inner member 200 and the outer radome member 300 in the covered configuration.

However, in alternative variations of this example, the ogive can be non-axisymmetric, and/or can have uniform curvature, and/or can be replaced with a conical form, and/or can have an inner surface having a form that is complementary to that of the dome outer surface 210, and/or have a rounder nose, for example.

In this example the outer radome member 300 has rounded cross-sections in planes transverse to the longitudinal axis LA—for example circular cross-sections, or elliptical cross-sections, or super elliptical cross-sections. However, in alternative variations of this example and in other examples, the outer radome member 300 has non-rounded cross-sections in planes transverse to the longitudinal axis LA—for example polygonal, providing a faceted configuration for the outer radome member 300.

The outer radome member 300 is removably mounted to the air vehicle 1 by engagement of the base edge 330 with the shoulder 5.

In at least this example, the outer radome member 300 is configured for being removed from the overlying relationship with the inner cover member 200 at a certain point in the trajectory of the vehicle 1, to thereby expose the inner cover member 200 to the airflow, and allow the EO unit 420 to operate.

To facilitate in-flight removal of the outer radome member 300, the outer radome member 300 is formed from a number of radome segments, in the illustrated example two radome segments 350. As best seen on FIG. 2, the two radome segments 350 are mirror images of one another, and are connected to one another along longitudinal edges 355 in the covered configuration, and detached from one another via the edges 355 in the uncovered configuration. In alternative variations of this example, the outer radome member is formed from a plurality of, for example three, four, or more than four, radome segments, mutatis mutandis.

In this example, the outer radome member 300 is directly and reversibly secured to the forward end 2, via reversible engagement between the base edge 330 and shoulder 5, for example via explosive bolts. In such cases, the radome segments 350 have to be separated from one another and concurrently from the forward end 5, for example simultaneously or with a small time interval between the two actions.

Figure 5:
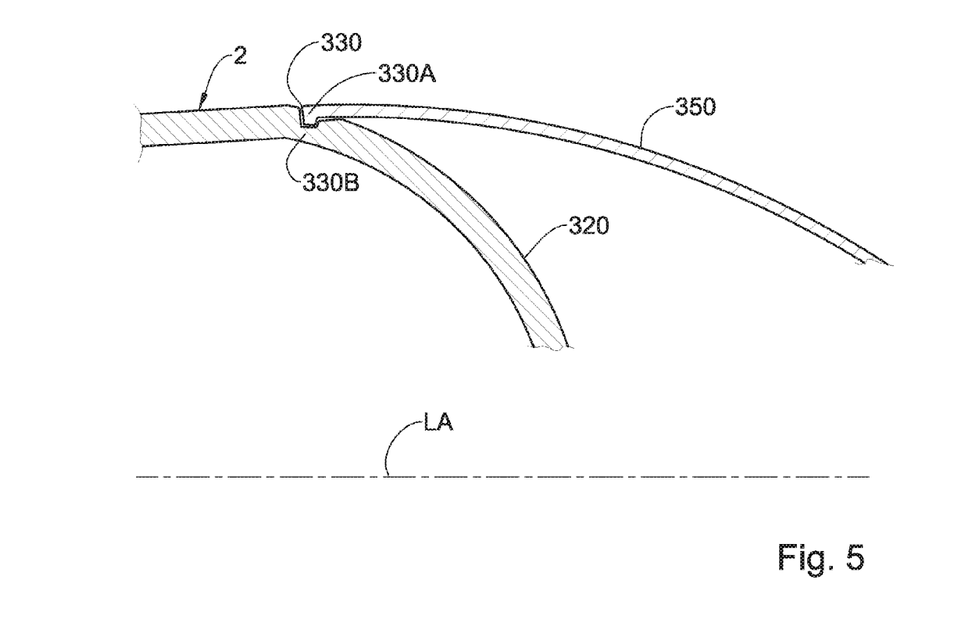
FIG. 5 is a partially fragmented side cross-sectional view of an alternative variation of the example of FIG. 1.

In alternative variations of this example and in other examples, the outer radome member 300 is not directly secured (i.e., is not independently engaged) to the forward end 2, but rather is indirectly secured to the forward end 2 via engagement of the radome segments 350 to one-another. For example, referring to FIG. 5, projections 330A are provided on the radome segments 350 at or near the base edge 330; the projections 330A face radially towards the longitudinal axis LA and radially engage in slots or a groove 330B provided in the casing 3 or the inner dome member 420. When projections 330A are engaged in the groove 330B and the radome segments 350 are connected to one another, the outer radome member 300 is automatically locked onto, and thus prevented from moving with respect to, the forward end 2; when the radome segments 350 are disengaged from one another, the projections 330A can move out of the groove 330B allowing the radome segments 350 to be fully detached from the air vehicle.

In this example, the radome segments 350 are held together via explosive bolts, which can be activated when desired to separate the radome segments 350 from one another. Alternatively the radome segments 350 comprise reactive material, for example pyrotechnic or explosive material at the longitudinal edges 355, so that upon activation of the reactive material, the mechanical connection between the radome segments is weakened or destroyed, enabling the radome segments 350 to become separated from one another. For example, the reactive material can be activated by heating or passing an electric current through the reactive material, to thereby detonate the reactive material.

In one example of operation of the instrument package 400 for homing onto a target when the air vehicle 1 is in flight along a particular trajectory F, and referring to FIG. 6, the RF unit 440 first operates to provide homing data to the airborne computer 480 for steering the air vehicle 1 during a first homing phase HM1 of the flight, while the air vehicle 1 is within a first range R1 of the target T, but greater than a second range R2. Once the air vehicle 1 is within the second range R2 from the target T, at point FO in the trajectory F, the instrument package 400 further operates to switch to the electro-optic unit 420, which operates to provide homing data to the airborne computer for steering the air vehicle 1 during the second homing phase HM2 of the flight, while the air vehicle 1 is within the second range R1 from the target, for example until the air vehicle 1 impacts or otherwise destroys the target.

For example, the location of point FO in the trajectory F can be chosen according to preset criteria, such as for example one or more of the following: after the passage of a certain time period after launch of the vehicle 1; when the vehicle 1 reaches a certain distance from an intended target, and this defines ranges R1 and R2, for example when the vehicle 1 is at range R2; when the vehicle 1 reaches a certain geographical location (in which case for example the vehicle 1 is configured for determining its geographical location); when the RF unit 440 cannot identify the target or cannot provide target data; when the RF unit 440 becomes inoperative or its operation is faulty; and so on.

Thus, during the first homing phase HM1 of the trajectory F and until point FO, the cover assembly 100 is in the covered configuration, with the outer radome member 300 exposed to the atmosphere and concurrently in overlying relationship with respect to the inner cover member 200. In this phase of the trajectory, the RF unit 440 is able to operate by transmitting and/or receiving EM energy in the operating wavelengths $\lambda_{RF}$, via the outer radome member 300 and the inner cover member 200, both being transparent to at least these operating wavelengths $\lambda_{RF}$. At the same time, the inner cover member 200 is not in direct contact with the airflow, and is protected from the atmospheric environment.

The air vehicle 1 is configured to execute the following two actions at point FO:
  (a) removal of the outer radome member 300 from the cover assembly 100 to provide the uncovered configuration, to thereby allow unhampered operation of the inner cover member 200.
  (b) switching operation from the RF unit 440 to the EO unit 420 (or at least commence operation of the EO unit 420, while the RF unit 440 continues to operate), executing a handshake procedure or handover procedure, or a data fusion procedure, to ensure continuity of homing operations of the instrument package 400.

In this homing example, action (a) precedes action (b). Thus when the outer radome member 300 is removed, both the RF unit 440 and the EO unit 420 are able to operate concurrently (for example via data fusion operation or hybrid operation). As such, both units can provide homing data concurrently, and thus enable the airborne computer to ensure smooth transition of operation of the instrument package 400 to the EO unit 420, and cease operation of the RF unit 440, to allow homing in the second homing phase HM2 of the flight to be via the EO unit 420. However, it is to be noted that, optionally, both the EO unit 420 and the RF unit 440 can continue to operate in the second homing phase HM2 of the flight.

It is thus evident to the skilled practitioner that the outer radome member 300 protects the inner cover member 200 during initial portions of the flight or trajectory of the air vehicle 1 during which the EO unit 420 is not required to operate, while at the same time allowing the RF unit 420 to operate to transmit and/or receive EM energy in the operating wavelengths $\lambda_{RF}$. Thereby, the inner cover member 200 is protected from the elements, in particular the weather and/or airborne contaminants (for example sand, ice, etc), while the EO unit 420 is not being operated, thereby preventing scratches, contaminant deposits and so on from forming on the inner cover member 200, and thus protecting the quality of the optical transparency of the inner cover member 200. Furthermore, the inner cover member 200 is also protected from the airflow by the outer radome member 300 during the initial stages of the flight or trajectory, and thus the inner cover member 200 does not need to be structured to withstand high aerodynamic loads that may be present only in the initial stages of the flight or trajectory, but not present in later stages of the flight or trajectory when the EO unit 420 is required to be operated.

Optionally, an additional protective cover (not shown) can be provided for the outer radome cover 300, to protect the cover assembly 100, and in particular the outer radome member 300, during transportation and handling, and until the air vehicle 1 to be launched, for example. Thus, the protective cover can be selectively discarded, for example on the ground (e.g. by ground crew), prior to the air vehicle being launched or fitted to a carrier vehicle such as for example an aircraft. The protective cover does not require to be transparent to any of the first wavelength range $\lambda 1$ or second wavelength range $\lambda 2$.

In some alternative variations of the above examples, the inner cover member 200 is not permanently fixed on the forward end 2 covering the sensor/emitting face 410. For example, the inner cover member can be configured for being in overlying relationship with the common aperture only once the outer radome member has been removed, and prior to this the inner cover member is retracted away from the common aperture; for example, the inner cover member can be made from two or more parts that are movable (for example hinged), so that in the retracted configuration they can be moved out of alignment with the common aperture, and when the radome is removed, or about to be removed, the parts are moved into engagement to form a contiguous inner cover member in alignment with the common aperture. In another example, the inner cover member is in one piece and is movable from a retracted position in which the inner cover member is out of alignment with the common aperture, to an overlying position in which the inner cover member in alignment with the common aperture.

In some alternative variations of the above examples, the inner cover member 200 is in overlying relationship only with respect to the aperture of the optical unit(s). in such examples, the inner cover member is thus substantially transparent to electromagnetic (EM) radiation of at least a first wavelength range, and configured for being mounted in overlying relationship with respect to the aperture(s) of the components of the instrument package that operate within said first wavelength range.

In such cases, the inner cover member 200 does not need to be transparent to the operating wavelengths $\lambda_{RF}$ of the RF unit 440.

In general the inner cover member 200 needs to be transparent to the operating wavelengths $\lambda_{RF}$ of the RF unit 440, when the inner cover member 200 is in overlying relationship with the common aperture or at least with the aperture of the RF unit 440 and where it is desired to operate the RF unit 440 and the EO unit 420 concurrently.

In the method claims that follow, alphanumeric characters and Roman numerals used to designate claim steps are provided for convenience only and do not imply any particular order of performing the steps.

Finally, it should be noted that the word "comprising" as used throughout the appended claims is to be interpreted to mean "including but not limited to".

While there has been shown and disclosed examples in accordance with the presently disclosed subject matter, it will be appreciated that many changes may be made therein without departing from the spirit of the presently disclosed subject matter.

The invention claimed is:

1. A seeker head for an air vehicle, the seeker head comprising:
   a cover assembly; and
   an instrument package;
   wherein the cover assembly includes an inner cover member and an outer radome member, said inner cover member and said outer radome member being associated with a common aperture, and wherein:
      said inner cover member is substantially transparent to electromagnetic (EM) radiation of at least a first wavelength range;
      said outer radome member is configured for selectively and reversibly covering the inner cover member and transparent to EM radiation of at least a second wavelength range different from said first wavelength range, the second wavelength range including a radio frequency (RF) wavelength range;
      said outer radome member is configured for being initially in overlying relationship with respect to said inner cover member and for being selectively removed from said overlying relationship with respect to said inner cover member at least during flight conditions; and
      said outer radome member is in overlying relationship with respect to said common aperture when said outer radome member is mounted in overlying relationship with respect to said instrument package;
   wherein the instrument package includes:
      at least one first sensing/emitting unit configured for operating in said first wavelength range via emission/reception of EM radiation in said first wavelength range through at least said inner cover member via said common aperture; and
      at least one second sensing/emitting unit configured for operating in said second wavelength range, via emission/reception of EM radiation in said second wavelength range through at least said outer radome via said common aperture.

2. The seeker head according to claim 1, wherein said first wavelength range and said second wavelength range exhibit a lack of overlap therebetween.

3. The seeker head according to claim 1, wherein said first wavelength range includes wavelengths corresponding to at least one of: the visible spectrum; infra red (IR) spectrum; or ultraviolet (UV) spectrum.

4. The seeker head according to claim 1, wherein said second wavelength range includes RF wavelengths corresponding to at least one of: L-band, S-band, C-band, X-band, K-band, V-band, W-band, Multi-band, or Y-band.

5. The seeker head according to claim 1, wherein said inner cover member is further substantially transparent to EM radiation of said second wavelength range.

6. The seeker head according to claim 1, wherein the inner cover member is made from a material transparent to said radiation of at least said first wavelength range.

7. The seeker head according to claim 1, wherein the inner cover radome cover is made from any one of: Silicon, Silicon oxide (SiO), or other Silicon-based materials; Copper oxide (CuO); Manganese Oxide (MnO); Germanium; Sapphire; Magnesium aluminate spinel ($MgAl_2O_4$); Yttria; AlON ($Al_{23}O_{27}N_5$); Alumina; YAG, Nd:YAG; plastic; glass; composite materials; or transparent spinel.

8. The seeker head according to claim 1, wherein the outer radome cover is made from a material transparent to said radiation of said second wavelength range.

9. The seeker head according to claim 1, wherein the outer radome cover is made from any one of: Slip Cast Fused Silica; ceramic materials; composite materials such as for example quartz-based composite materials; Teflon; some plastics; Ultem; fiberglass; PTFE-coated fabrics; boron carbide, alumina, glass, or silicon carbide.

10. The seeker head according to claim 1, wherein the inner member is formed as a transparent dome.

11. The seeker head according to claim 1, wherein the outer member has an ogive form.

12. The seeker head according to claim 1, wherein said outer radome member is reversibly engageable with respect to the inner cover member.

13. The seeker head according to claim 1, wherein:
   the outer radome member is formed from a plurality of radome segments;
   in said overlying relationship with respect to the inner cover member said radome segments are mutually engaged together;
   said outer radome member is selectively removable from said inner cover member by mutually disengaging said radome segments.

14. The seeker head according to claim 13, wherein said radome segments are reversibly connected to one another along longitudinal edges thereof when mutually engaged together.

15. The seeker head according to claim 13, wherein said radome segments are held together via explosive bolts, which are configured for being selectively activated to separate the radome segments from one another.

16. The seeker head according to claim 13, wherein said radome segments include reactive material, wherein upon activation of the reactive material, a mechanical connection between said radome segments is weakened or destroyed, enabling said radome segments to become separated from one another.

17. The seeker head according to claim 1, wherein the cover assembly is configured for use with a seeker head accommodating the instrument package, and wherein at least the inner cover member is configured for being affixed to the seeker head.

18. The seeker head according to claim 1, further comprising a radome cover for selectively and reversibly covering the outer radome member.

19. The seeker head according to claim 1, wherein the outer radome member is configured for being concurrently in overlying relationship with respect to the common aperture when initially in said overlying relationship with respect to the inner cover member.

20. The seeker head according to claim 1, wherein each said sensing/emitting unit is adapted for at least one of sensing and emitting energy along a respective sensing/emitting unit line of sight aligned with respect to said common aperture.

21. The seeker head according to claim 1, wherein said at least one first sensing/emitting unit includes any one of: an imaging camera, CCD, CMOS, configured for video imaging and/or still picture imaging, in any one or more of the visible spectrum, the infra red spectrum (IR), or in the ultraviolet spectrum (UV); a visual unit, an IR sensor, a thermal sensor, a NIR sensor; laser-based module optionally including LADAR or LIDAR; or bolometric sensor.

22. The seeker head according to claim 1, wherein said at least one second sensing/emitting unit includes any one of: a passive RF seeker; an active or semi active RADAR seeker; an RF range sensor; a Doppler radar; a synthetic aperture radar (SAR); passive phased array/passive electronically scanned array (PESA) seeker; active phased array/active electronically steered array/active electronically scanned array (AESA) seeker/DBF (digital beam forming) seeker/proximity sensor; or an anti-radiation RF sensor.

23. The seeker head according to claim 1, further comprising a controller for selectively causing the outer radome member to be removed from said overlying relationship with the inner cover member according to preset criteria.

24. The seeker head according to claim 23, wherein said controller is further configured for concurrently operating said at least one first sensing/emitting unit and said at least one second sensing/emitting unit for at least a predetermined time interval after said outer radome member is removed to thereby synchronize operation of said at least one first sensing/emitting unit with said at least one second sensing/emitting unit.

25. An air vehicle comprising the seeker head as defined in claim 1.

26. The air vehicle according to claim 25, wherein the air vehicle includes any one of an air-to-air missile, an air-to-surface missile, a surface-to-air missile, a surface-to-surface missile, a cruise missile, an anti-missile interceptor, munitions, a gliding bomb, a guided bomb, a rocket, a MK bomb including a homing kit, or a UAV.

27. A method for operating a seeker head, the method comprising:
  providing the seeker head as defined in claim 1; and
  operating the seeker head to selectively remove the outer radome member from said overlying relationship with the inner cover member according to preset criteria.

* * * * *